US008271895B2

(12) United States Patent
Tseo et al.

(10) Patent No.: US 8,271,895 B2
(45) Date of Patent: Sep. 18, 2012

(54) GUI FOR PROGRAMMING STEP AND REPEAT OPERATIONS IN A MACHINE VISION INSPECTION SYSTEM

(75) Inventors: Eric Yeh-Wei Tseo, Seattle, WA (US); Dahai Yu, Redmond, WA (US); Ryan Northrup, Renton, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 124 days.

(21) Appl. No.: 12/729,105

(22) Filed: Mar. 22, 2010

(65) Prior Publication Data

US 2011/0231787 A1    Sep. 22, 2011

(51) Int. Cl.
G06F 3/048    (2006.01)
(52) U.S. Cl. .................. 715/771; 382/141; 382/152
(58) Field of Classification Search .................. 715/771; 382/141, 145, 152
See application file for complete search history.

(56) References Cited

U.S. PATENT DOCUMENTS

| | | | | |
|---|---|---|---|---|
| 5,579,445 A | * | 11/1996 | Loce et al. | 358/1.2 |
| 5,796,868 A | * | 8/1998 | Dutta-Choudhury | 382/199 |
| 5,963,314 A | * | 10/1999 | Worster et al. | 356/237.2 |
| 6,542,180 B1 | | 4/2003 | Wasserman | |
| 6,563,324 B1 | * | 5/2003 | Nichani | 324/537 |
| 6,597,381 B1 | * | 7/2003 | Eskridge et al. | 715/804 |
| 6,775,583 B2 | * | 8/2004 | Slodowski et al. | 700/121 |
| 6,973,209 B2 | * | 12/2005 | Tanaka | 382/149 |
| 7,324,682 B2 | | 1/2008 | Wasserman | |
| 7,359,544 B2 | * | 4/2008 | Gao et al. | 382/145 |
| 7,376,904 B2 | * | 5/2008 | Cifra et al. | 715/763 |
| 7,454,053 B2 | | 11/2008 | Bryll | |

OTHER PUBLICATIONS

Mitutoyo Corp., QVPAK User's Guide, Copyright 1995-2003, Version 7, Whole Document.*
Bryll, R.K., "System and Method for Fast Approximate Focus," U.S. Appl. No. 12/343,383, filed Dec. 23, 2008.
Campbell, S.R., "Autofocus Video Tool and Method for Precise Dimensional Inspection," U.S. Appl. No. 12/608,943, filed Oct. 29, 2009.
"QVPAK 3D CNC Vision Measuring Machine: Operating Guide," Version 2.0, Manual No. 4911GB, Series No. 359, Mitutoyo Corporation & Micro Encoder Inc., Kanagawa, Japan, Sep. 1996.
"QVPAK 3D CNC Vision Measuring Machine: User's Guide," Version 7.1, 2d ed., Manual No. 99MCB225A1, Series No. 359, Mitutoyo Corporation & Micro Encoder Inc., Kanagawa, Japan, Sep. 2003.

* cited by examiner

*Primary Examiner* — Phenuel Salomon
(74) *Attorney, Agent, or Firm* — Christensen O'Connor Johnson Kindness PLLC

(57) ABSTRACT

A method is provided for programming step and repeat operations of a machine vision inspection system. The machine vision inspection system includes an imaging portion, a stage for holding one or more workpieces in a field of view (FOV) of the imaging portion, a control portion, and a graphical user interface (GUI). According to the method, a user operates the machine vision inspection system to define a set of inspection operations to be performed on a first configuration of workpiece features. The user also operates the GUI to display a step and repeat dialog box, in which he defines a first plurality of parameters defining a set of default step and repeat locations for performing the defined set of inspection operations. The user further operates the GUI to define a set of inspection step and repeat locations, which is a subset of the defined set of default step and repeat locations, where the inspection operations are to be actually performed.

19 Claims, 10 Drawing Sheets

Ending Step and Repeat Loop Definition.

Next Action:

- ● Generate Simulated Step and Repeat Inspection Results?
- ○ Generate Actual Step and Repeat Inspection Results?

| OK | Cancel |

*Fig. 9.*

GUI FOR PROGRAMMING STEP AND REPEAT OPERATIONS IN A MACHINE VISION INSPECTION SYSTEM

FIELD OF THE INVENTION

The invention relates generally to machine vision inspection systems, and more particularly to methods, video tools, and user interface features usable to define and program inspection operations for such systems.

BACKGROUND

Precision machine vision inspection systems (or "vision systems" for short) can be utilized to obtain precise dimensional measurements of inspected objects and to inspect various other object characteristics. Such systems may include a computer, a camera and optical system, and a precision stage that is movable in multiple directions so as to allow the camera to scan the features of a workpiece that is being inspected. One exemplary prior art system that is commercially available is the QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the *QVPAK 3D CNC Vision Measuring Machine User's Guide*, published January 2003, and the *QVPAK 3D CNC Vision Measuring Machine Operation Guide*, published September 1996, each of which is hereby incorporated by reference in their entirety. This product, as exemplified by the QV-302 Pro model, for example, is able to use a microscope-type optical system to provide images of a workpiece at various magnifications, and move the stage as necessary to traverse the workpiece surface beyond the limits of any single video image. A single video image typically encompasses only a portion of the workpiece being observed or inspected, given the desired magnification, measurement resolution, and physical size limitations of such systems.

Machine vision inspection systems generally utilize automated video inspection. U.S. Pat. No. 6,542,180 (the '180 patent) teaches various aspects of such automated video inspection and is incorporated herein by reference in its entirety. As taught in the '180 patent, automated video inspection metrology instruments generally have a programming capability that allows an automatic inspection event sequence to be defined by the user for each particular workpiece configuration. This can be implemented by text-based programming, for example, or through a recording mode which progressively "learns" the inspection event sequence by storing a sequence of machine control instructions corresponding to a sequence of inspection operations performed by a user with the aid of a graphical user interface, or through a combination of both methods. Such a recording mode is often referred to as "learn mode" or "training mode." Once the inspection event sequence is defined in "learn mode," such a sequence can then be used to automatically acquire (and additionally analyze or inspect) images of a workpiece during "run mode."

The machine control instructions including the specific inspection event sequence (i.e., how to acquire each image and how to analyze/inspect each acquired image) are generally stored as a "part program" or "workpiece program" that is specific to the particular workpiece configuration. For example, a part program defines how to acquire each image, such as how to position the camera relative to the workpiece, at what lighting level, at what magnification level, etc. Further, the part program defines how to analyze/inspect an acquired image, for example, by using one or more video tools such as edge/boundary detection video tools.

Video tools (or "tools" for short) and other graphical user interface features may be used manually to accomplish manual inspection and/or machine control operations (in "manual mode"). Their set-up parameters and operation can also be recorded during learn mode, in order to create automatic inspection programs, or "part programs." Video tools may include, for example, edge/boundary detection tools, autofocus tools, shape or pattern matching tools, dimension measuring tools, and the like. Other graphical user interface features may include dialog boxes related to data analysis, step and repeat loop programming, and the like. For example, such tools are routinely used in a variety of commercially available machine vision inspection systems, such as the QUICK VISION® series of vision systems and the associated QVPAK® software, discussed above.

The currently available features and graphical user interface (GUI) controls for step and repeat programming are limited. In particular, there are limited alternatives available for setting up step and repeat operations and related operating parameters during learn mode or manual mode. Accordingly, existing alternatives may be insufficient, and not readily adaptable, for efficient use with some workpieces. Furthermore, existing user interfaces for the step and repeat operations are not particularly intuitive, making user learning and retention difficult. A need exists for step and repeat user interface features, which overcome these and other deficiencies to allow more efficient, intuitive, and flexible use and programming of precision machine vision inspection systems.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with some exemplary embodiments of the present invention, a method is provided for programming step and repeat operations of a machine vision inspection system. The machine vision inspection system includes an imaging portion, a stage for holding one or more workpieces (to be inspected) in a field of view (FOV) of the imaging portion, a control portion, and a graphical user interface (GUI). The method includes generally five steps to be performed by an operator (user) of the machine vision inspection system.

First, the user operates the machine vision inspection system to define a set of inspection operations to be performed on a first configuration of workpiece features. Second, the user operates the GUI to display a step and repeat dialog box. The step and repeat dialog box includes a first plurality of parameters defining a set of "default" step and repeat locations where the defined set of inspection operations may be performed on corresponding instances of the first configuration of workpiece features. Third, the user operates the GUI to define the first plurality of parameters in the displayed step and repeat dialog box in order to define the set of default step and repeat locations, to thereby display a graphical representation of the members of the defined set of default step and repeat locations in the GUI. Fourth, the user operates the GUI to define a set of "inspection" step and repeat locations, which is a subset of the defined set of "default" step and repeat locations. The inspection step and repeat locations are where the defined set of inspection operations are to be actually performed. To define a set of inspection step and repeat locations, the user first indicates at least one member to be excluded in the graphical representation of the members of the defined set of default step and repeat locations using, for example, a suitable input device such as a mouse. The user then defines the set of inspection step and repeat locations to be the set of default step and repeat locations less the indicated at least one member to be excluded, to thereby display a graphical representation of the members of the defined set of inspection step and repeat locations in the GUI. Fifth, the user records the defined set of inspection step and repeat locations in a part program to be used for inspecting a plurality of instances of the first configuration of workpiece features.

In accordance with further aspects of the present invention, a machine vision inspection system suitable for carrying out the method described above is also provided.

The present invention according to various exemplary embodiments provides efficient, intuitive, and flexible GUI features that allow a user to readily program and use step and repeat loop operations in a machine vision inspection system.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 9 is a sample dialog box to be displayed on the machine vision inspection system of FIG. 1, prompting a user to select either generating simulated step and repeat inspection results or generating actual step and repeat inspection results (e.g., in association with the method of FIG. 8), in accordance with exemplary embodiments of the present invention.

DETAILED DESCRIPTION

Figure 1:
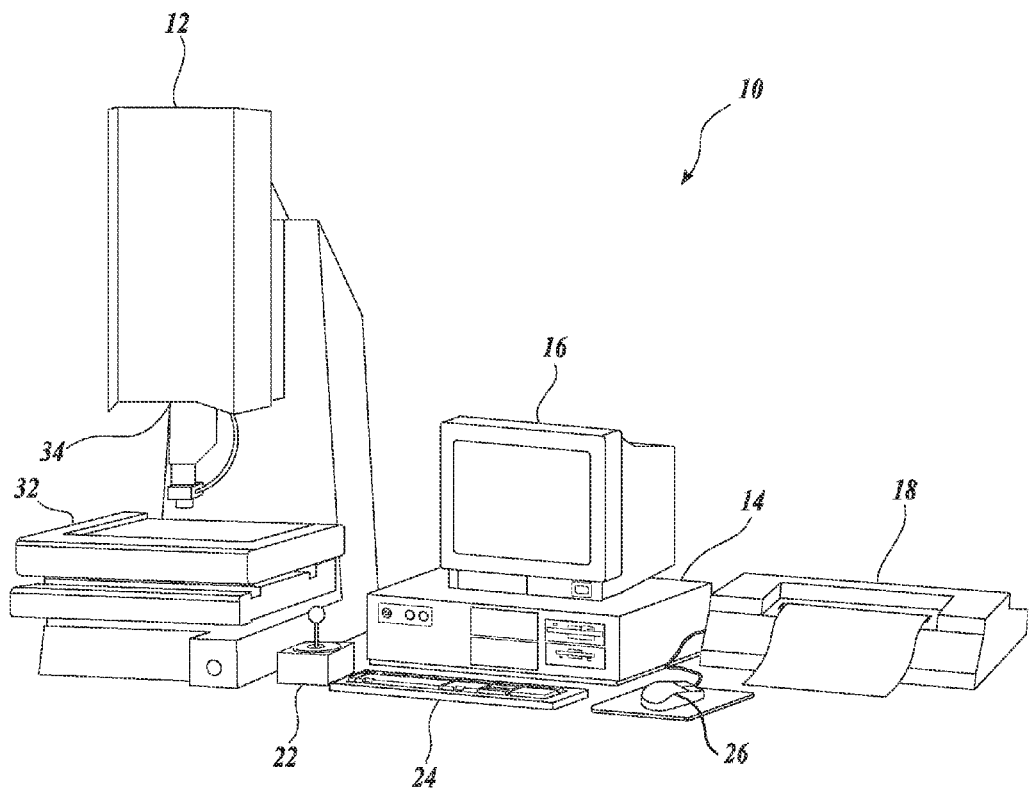
FIG. 1 is a diagram showing various typical components of a general purpose precision machine vision inspection system.

FIG. 1 is a block diagram of one exemplary machine vision inspection system 10 usable in accordance with the present invention. The machine vision inspection system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision inspection system 10.

The vision measuring machine 12 includes a moveable workpiece stage 32 and an optical imaging system 34 which may include a zoom lens or interchangeable lenses. The zoom lens or interchangeable lenses generally provide various magnifications for the images provided by the optical imaging system 34. The machine vision inspection system 10 is generally comparable to the QUICK VISION® series of vision systems and the QVPAK® software discussed above, and similar state-of-the-art commercially available precision machine vision inspection systems. The machine vision inspection system 10 is also described in commonly assigned U.S. Pat. Nos. 7,454,053; 7,324,682; and U.S. patent application Ser. Nos. 12/343,383, filed Dec. 23, 2008; 12/608,943, filed Oct. 29, 2009, which are each incorporated herein by reference in their entireties.

Refined step and repeat user interface features, and related methods and operations disclosed herein, can provide more efficient, intuitive, and flexible use and programming of general purpose precision machine vision inspection systems such as that shown in FIG. 1, particularly for novice or infrequent users.

Figure 2:
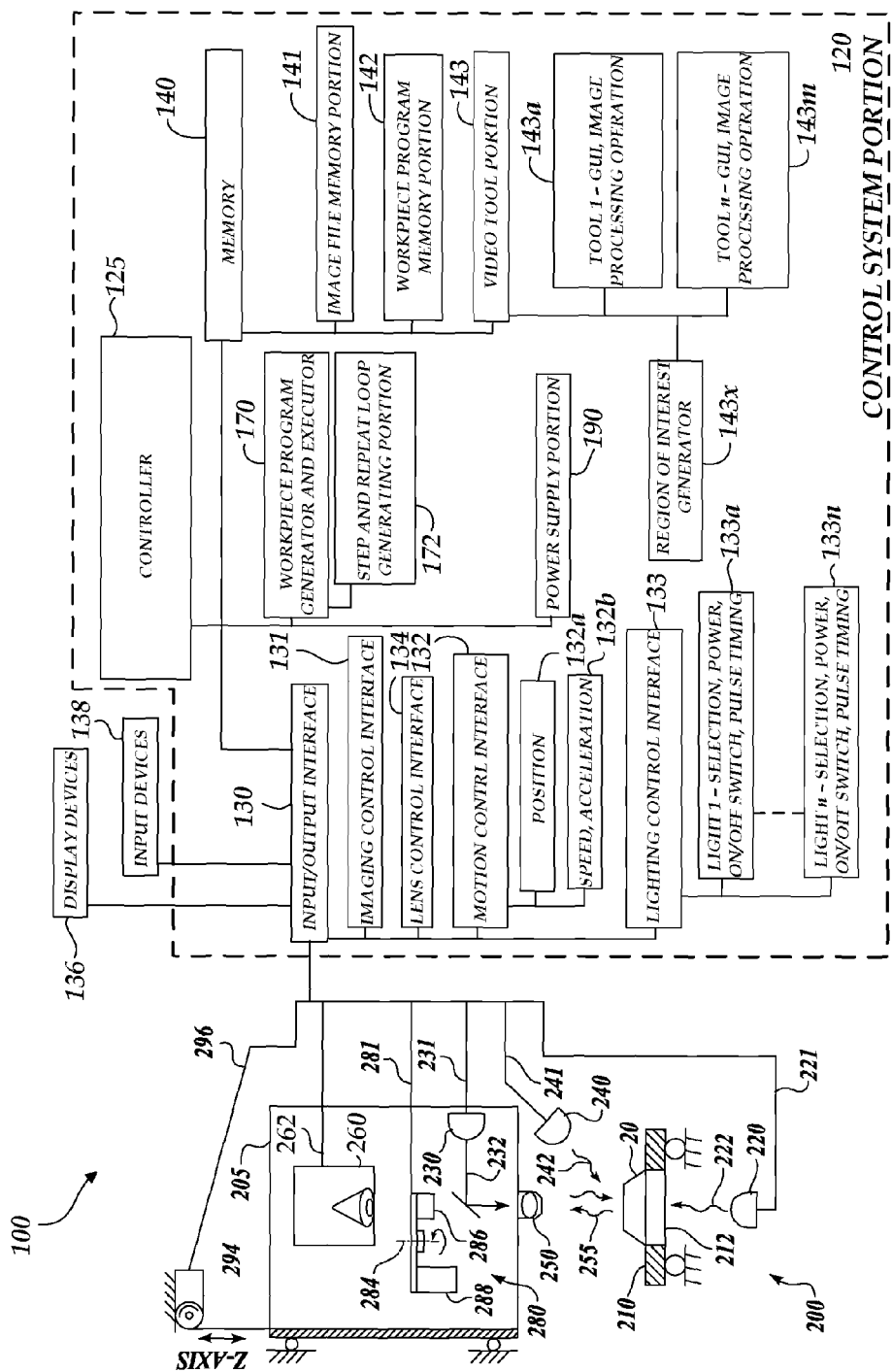
FIG. 2 is a block diagram of a control system portion and a vision components portion of a machine vision inspection system of FIG. 1.

FIG. 2 is a block diagram of a control system portion 120 and a vision components portion 200 of a machine vision inspection system 100 in accordance with the present invention. As will be described in more detail below, the control system portion 120 is utilized to control the vision components portion 200. The vision components portion 200 includes an optical assembly portion 205, light sources 220, 230 and 240, and a workpiece stage 210 having a central transparent portion 212. The workpiece stage 210 is controllably movable along X and Y axes that lie in a plane that is generally parallel to the surface of the stage where a workpiece 20 may be positioned. The optical assembly portion 205 includes a camera system 260, an interchangeable objective lens 250, and may include a turret lens assembly 280 having lenses 286 and 288. Alternatively to the turret lens assembly, a fixed or manually interchangeable magnification-altering lens, or a zoom lens configuration, or the like, may be included. The optical assembly portion 205 is controllably movable along a Z axis that is generally orthogonal to the X and Y axes, by using a controllable motor 294, as described further below.

A workpiece 20, or a tray or fixture holding a plurality of workpieces 20, which is to be imaged using the machine vision inspection system 100 is placed on the workpiece stage 210. The workpiece stage 210 may be controlled to move relative to the optical assembly portion 205, such that the interchangeable objective lens 250 moves between locations on a workpiece 20, and/or among a plurality of workpieces 20. One or more of a stage light 220, a coaxial light 230, and a surface light 240 may emit source light 222, 232, or 242, respectively, to illuminate the workpiece or workpieces 20. The source light is reflected or transmitted as workpiece light 255, which passes through the interchangeable objective lens 250 and the turret lens assembly 280 and is gathered by the camera system 260. The image of the workpiece(s) 20, captured by the camera system 260, is output on a signal line 262 to the control system portion 120. The light sources 220, 230, and 240 may be connected to the control system portion 120 through signal lines or busses 221, 231, and 241, respectively. To alter the image magnification, the control system portion 120 may rotate the turret lens assembly 280 along axis 284 to select a turret lens, through a signal line or bus 281.

In various exemplary embodiments, the optical assembly portion 205 is movable in the vertical Z axis direction relative to the workpiece stage 210 using a controllable motor 294 that drives an actuator, a connecting cable, or the like, to move the optical assembly portion 205 along the Z axis to change the focus of the image of the workpiece 20 captured by the camera system 260. The term Z axis, as used herein, refers to the axis that is intended to be used for focusing the image obtained by the optical assembly portion 205. The controllable motor 294, when used, is connected to the input/output interface 130 via a signal line 296.

As shown in FIG. 2, in various exemplary embodiments, the control system portion 120 includes a controller 125, the input/output interface 130, a memory 140, a workpiece program generator and executor 170, and a power supply portion 190. Each of these components, as well as the additional components described below, may be interconnected by one or more data/control buses and/or application programming interfaces, or by direct connections between the various elements.

In various embodiments according to this invention, the workpiece program generator and executor 170 includes the step and repeat loop generating portion 172, which provides or activates various operations and user interface features related to step and repeat operations and related programming, as described in greater detail below. Alternative configurations are possible for the step and repeat loop generating portion 172. For example, in some embodiments, the workpiece program generator and executor 170 and the step and repeat loop generating portion 172 may be merged and/or indistinguishable. More generally, the invention may be implemented in any now known or later-developed form that is operable in conjunction with the machine vision inspection system 100 to provide the user interface features and related programming and other operations disclosed herein.

The input/output interface 130 includes an imaging control interface 131, a motion control interface 132, a lighting control interface 133, and a lens control interface 134. The motion control interface 132 may include a position control element 132a, and a speed/acceleration control element 132b. However, it should be appreciated that in various exemplary embodiments, such elements may be merged and/or indistinguishable. The lighting control interface 133 includes lighting control elements 133a-133n, which control, for example, the selection, power, on/off switch, and strobe pulse timing if applicable, for the various corresponding light sources of the machine vision inspection system 100.

The memory 140 includes an image file memory portion 141, a workpiece program memory portion 142 that may include one or more part programs, or the like, and a video tool portion 143. The video tool portion 143 includes tool portion 143a and other similar tool portions (~143m), which determine the GUI, image processing operation, etc., for each of the corresponding tools. The video tool portion 143 also includes a region of interest generator 143x that supports automatic, semi-automatic and/or manual operations that define various ROIs that are operable in various video tools included in the video tool portion 143.

In general, the memory portion 140 stores data usable to operate the vision system components portion 200 to capture or acquire an image of the workpiece 20 such that the acquired image of the workpiece 20 has desired image characteristics. The memory portion 140 may also store inspection result data, may further store data usable to operate the machine vision inspection system 100 to perform various inspection and measurement operations on the acquired images (e.g., implemented, in part, as video tools), either manually or automatically, and to output the results through the input/output interface 130. The memory portion 140 may also contain data defining a graphical user interface operable through the input/output interface 130.

The signal lines or busses 221, 231 and 241 of the stage light 220, the coaxial light 230, and the surface light 240, respectively, are all connected to the input/output interface 130. The signal line 262 from the camera system 260 and the signal line 296 from the controllable motor 294 are connected to the input/output interface 130. In addition to carrying image data, the signal line 262 may carry a signal from the controller 125 that initiates image acquisition.

One or more display devices 136 (e.g., the display 16 of FIG. 1) and one or more input devices 138 (e.g., the joystick 22, keyboard 24, and mouse 26 of FIG. 1) can also be connected to the input/output interface 130. The display devices 136 and input devices 138 can be used to display a user interface, which may include various graphical user interface (GUI) features that are usable to perform inspection operations, and/or to create and/or modify part programs, to view the images captured by the camera system 260, and/or to directly control the vision system components portion 200. In particular, according to various exemplary embodiments of the present invention, the display devices 136 and input devices 138 are used to present various GUI features usable to allow efficient, intuitive, and flexible use and programming of step and repeat loop operations on the machine vision inspection system 100.

In various exemplary embodiments, when a user utilizes the machine vision inspection system 100 to create a part program for the workpiece 20, the user generates part program instructions either by explicitly coding the instructions automatically, semi-automatically, or manually, using a workpiece programming language, and/or by generating the instructions by operating the machine vision inspection system 100 in a learn mode to provide a desired image acquisition training sequence. For example, a training sequence may comprise positioning a workpiece feature in the field of view (FOV), setting light levels, focusing or autofocusing, acquiring an image, and providing an inspection training sequence applied to the image (e.g., using video tools). The learn mode operates such that the sequence(s) are captured or recorded and converted to corresponding part program instructions.

These instructions, when the part program is executed, will cause the machine vision inspection system to reproduce the trained image acquisition and inspection operations to automatically inspect a workpiece or workpieces matching the workpiece used when creating the part program.

These analysis and inspection methods that are used to inspect features in a workpiece image are typically embodied in various video tools included in the video tool portion 143 of the memory 140. Many known video tools, or "tools" for short, are included in commercially available machine vision inspection systems, such as the QUICK VISION® series of vision systems and the associated QVPAK® software, discussed above.

Figure 3:
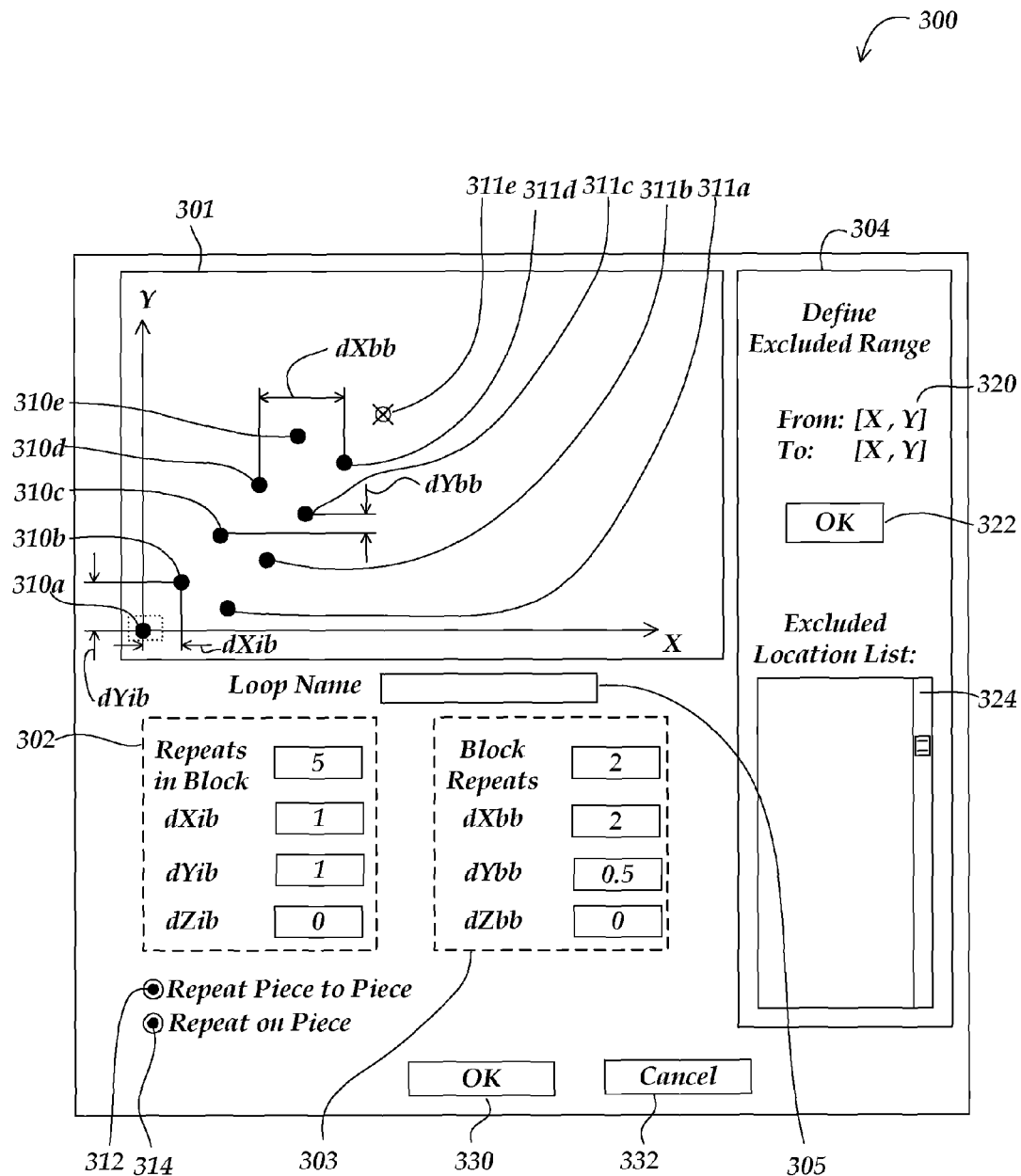
FIG. 3 is a screen shot of a display of the machine vision inspection system of FIG. 1, illustrating the graphical user interface (GUI) comprising a dialog box for defining step and repeat locations in Cartesian coordinates, configured in accordance with exemplary embodiments of the present invention.

FIG. 3 is a sample screen shot of the display device 136 (e.g., the display 16 of FIG. 1), illustrating the GUI features forming a step and repeat dialog box 300 that allows a user to define step and repeat locations in Cartesian coordinates. The step and repeat dialog box 300 includes generally four sub-boxes: a graphical display sub-box 301, block definition sub-box 302 (alternatively referred to as inner loop definition sub-box 302), a block repetition definition sub-box 303 (alternatively referred to as outer loop definition sub-box 303), and a "Define Excluded Range" sub-box 304. While the illustrated example of the step and repeat dialog box 300 includes these sub-boxes, the present invention is not limited to this particular configuration, and any number or arrangement of sub-boxes is possible to form a step and repeat dialog box of the present invention.

In the following description, due to the one-to-one correspondence between a widget and the location that it represents, certain descriptions are more easily interpreted if the same reference number is used for either the widget or its corresponding location (e.g., the widget 31X, at location 31X). Any distinctions between a similarly numbered widget and the location that it represents will be clear based on description or context.

The display sub-box 301 graphically illustrates the location "31X" (e.g., 310a, 311c) of each similar configuration of workpiece features to be inspected. The location "31X" of an instance of the configuration of workpiece features is represented as a dot-shaped widget 31X in the illustrated embodiment. The configuration of workpiece features to be inspected at a particular "step" may take various forms, for example, a relatively simple form such as a single feature, to a relatively complicated form such as a complex combination of various workpiece features. It should be understood that the dot-shaped widget 31X is used to merely symbolically represent the relative location of a configuration of workpiece features to be inspected (with respect to other configurations) for the purpose of step and repeat programming, and the widget shape at a location is not necessarily representative of the actual configuration of workpiece features to be inspected at that location.

In step and repeat programming, the inspection of a configuration of workpiece features is repeated in a plurality of instances at different locations—for example, in five locations 310a-310e in a first block, in the illustrated embodiment. In the illustrated embodiment, the instances of the configuration in the five locations 310a-310e may be considered to correspond to an inner block (ib) "repeat loop," which can be defined by the user entering a set of instance repetition parameters in the block definition sub-box 302. In the embodiment shown in FIG. 3, the instance repetition parameters that define a block of step and repeat locations (e.g., 310a-310e) include the offset (delta) value along the X axis ("dXib") between the instances or members of the block, the offset value along the Y axis ("dYib"), and the offset value along the Z axis ("dZib"), all starting from the reference location (the location 310a). The user may also numerically define the number of instances or members to be repeated in the block ("Repeats in Block"). In the illustrated example, the user has specified the offset value along both the X axis and the Y axis to be "1" and specified the repeat value to be "5," to thereby cause the five (5) dot-shaped widgets to appear at the five locations 310a-310e, respectively, in the graphical display sub-box 301. If a non-zero value is entered as "dZib," the locations of the instances will be programmed to be offset along the Z axis that is perpendicular to both the X axis and the Y axis, even though this is not represented in the display sub-box 301. In accordance with various exemplary embodiments of the present invention, the user entry of numeric values in the block definition sub-box 302 automatically causes the widgets to be displayed at the corresponding locations (e.g., 310a-310e) in the graphical display sub-box 301. If the user changes the values entered in the block definition sub-box 302, the display of widgets will automatically change to correspond to the newly specified values.

The block repetition definition sub-box 303 allows the user to define a set of block repetition parameters, which may be considered to define an outer "repeat loop" of the step and repeat programming operations. However, it should be appreciated that while the nomenclature of inner and outer repeat loops is used here to suggest one possible underlying programming approach, other programming approaches are possible. Furthermore, actual execution of inspection operations need not follow an inspection path that is constrained according to inner and outer loops, or the like, but may follow any efficient path. Thus, the nomenclature used here is exemplary only, and not limiting. In the embodiment shown in FIG. 3, the block repetition parameters include the block-to-block offset value along the X axis ("dXbb"), the block-to-block offset value along the Y axis ("dYbb"), and the block-to-block offset value along the Z axis ("dZbb"), as well as the number of blocks to be repeated ("Block Repeats"). In the illustrated example, the user has specified the block-to-block offset value along the X axis to be "2," the block-to-block offset value along the Y axis to be "0.5," and the block repeat value to be "2." Accordingly, the five widgets at the locations 310a-310e of the first block are initially repeated at locations 311a-311e, respectively, where the location 311a is offset by "2" along the X axis and by "0.5" along the Y axis relative to the location 310a, for example. As with the block definition sub-box 302, user entry and editing of numeric values in the block repetition definition sub-box 303 automatically causes the widgets to be displayed in the corresponding locations (311a-311e) in the graphical display sub-box 301, in accordance with various exemplary embodiments of the present invention.

In various exemplary embodiments, a set of inspection operations to be performed on each instance of a configuration of workpiece features is defined by operations performed on a reference instance of the configuration at a reference location, such as the location 310a in FIG. 3. In other words, in step and repeat programming, the same operations performed on the reference location may be repeated at a plurality of instances of the configuration repeated at multiple locations. In accordance with various exemplary embodiments of the present invention, the reference location (310a in FIG. 3) may be shown distinguished graphically (e.g., in a different color) from other locations, to allow the user to readily identify the reference location.

The user may name the defined set of step and repeat locations in a "Loop Name" box 305. Also, the user may designate whether the defined step and repeat locations correspond to multiple workpieces or to multiple locations within a single workpiece. Specifically, when the step and repeat operations are to be repeated between a configuration on one workpiece and a configuration on another workpiece, the user may select a "Repeat Piece to Piece" button 312. When the step and repeat operations are to be repeated among multiple configurations on the same workpiece, the user may select a "Repeat on Piece" button 314.

The description above has explained how a user can readily and intuitively define and visually verify a plurality of regularly arranged step and repeat locations, that is, a regular array of locations where a plurality of instances of the configuration to be inspected are respectively arranged. Such a regular array of step and repeat locations, as initially defined by the instance repetition parameters and the block repetition parameters outlined above, are herein referred to as "default" step and repeat locations. According to various exemplary embodiments of the present invention, the default step and repeat locations may thereafter be conveniently individually edited by the user. For example, the user may wish to exclude one or more instances (or locations) from the defined set of default step and repeat locations. Still referring to FIG. 3, for example, the user may wish to exclude the instance at the location 311e from the set. According to one embodiment of the present invention, the user may use a suitable input device, such as the mouse 26, to select the location 311e to be excluded. For example, the user may position a cursor of the mouse 26 proximate the location 311e and make a selection by clicking thereon. When the instance (or location) of the configuration is excluded, the graphical representation of the excluded location may change in the graphical display sub-box 301 according to various exemplary embodiments of the present invention. In one example, the excluded location may simply disappear and be shown as an empty space. Alternatively, as in the illustrated example, the excluded location may be indicated by an altered widget, such as a circle with "X" thereon (as compared to other dot-shaped widgets). In accordance with further embodiments of the present invention, the user may reinstate the excluded location by, for example, again using the mouse 26 to click on the excluded location. Then the graphical representation of the reinstated location returns to the original form, for example, to a dot-shaped widget. Displaying the graphical representation of inspection step and repeat locations, including excluding or reinstating some of the locations, may be done by either overwriting or modifying the graphical representation of the original default step and repeat locations.

Accordingly, the user may graphically edit (e.g., exclude, reinstate, etc.) individual instances or members of the set of "default" step and repeat locations, which are originally defined based on the parameters included in the block definition sub-box 302 and the block repetition definition sub-box 303, within the confines of a single step and repeat dialog box 300. The user may also edit the defined set of default step and repeat locations by using the "Define Excluded Range" sub-box 304, if it is included in the step and repeat dialog box 300. Specifically, if the "Define Excluded Range" sub-box 304 is included, the user may numerically (or textually) define a range of locations (or a number of ranges of locations) of the configuration instances to be excluded from the default step and repeat locations, in terms of "From: [X, Y]" and "To: [X, Y]" 320. For example, the user may specify that the locations that are within "From: [4, 3.5] To: [6, 4.5]" are to be excluded. The locations that are within X=4~6 and Y=3.5~4.5 include the locations 310e (4, 4), 311d (5, 3.5), and 311e (6, 4.5) in the illustrated embodiment and, therefore, these three locations would be excluded. The excluded locations in terms of their Cartesian coordinates may then be listed in the "Excluded Location List" 324 within the "Define Excluded Range" sub-box 302. Once the range of locations to be excluded is fully defined, the user selects the "OK" button 322 in the "Define Excluded Range" sub-box 302. The "Define Excluded Range" sub-box 302 may be particularly useful for excluding large blocks of default locations, for example, locations to be excluded in the center of a ball grid array, or the like. In various embodiments, completed entries in the "Define Excluded Range" sub-box 304 are immediately reflected in the graphical display sub-box 301. Similarly, graphical editing in the graphical display sub-box 301 may be immediately reflected in the "Define Excluded Range" sub-box 304.

It should be appreciated that a step and repeat dialog box that interactively combines various graphical representation and editing features with various text-based definition and editing features, as outlined above, provides a particularly intuitive user interface. Furthermore, either a novice or expert user can use such a dialog box with a high degree of ease and confidence, because the approximate geometric similarity of the graphical representation to the actual inspection locations (which may be visible in a field of view, or on a drawing) allows a user to quickly verify that the programmed configuration matches their intent, even for an irregular step and repeat pattern.

The final set of step and repeat locations, which are obtained after the user edits the default step and repeat locations, are herein referred to as "inspection" step and repeat locations. As described above, the present invention offers a number of intuitive and flexible GUI features that allow a user to define not only a regular array of the default step and repeat locations but also either a regular or irregular set of the "inspection" step and repeat locations. Once the inspection step and repeat locations are fully defined, the user may select the OK button 330 to accept the currently defined and displayed set of inspection step and repeat locations. On the other hand, if the user wishes to cancel any step and repeat location definition performed so far, the user may select the CANCEL button 332. In various exemplary embodiments of the present invention, user selection of the OK button 330 automatically records the defined set of inspection step and repeat locations in a part program to be used for inspecting a plurality of instances of the configuration of workpiece features.

Figure 4:
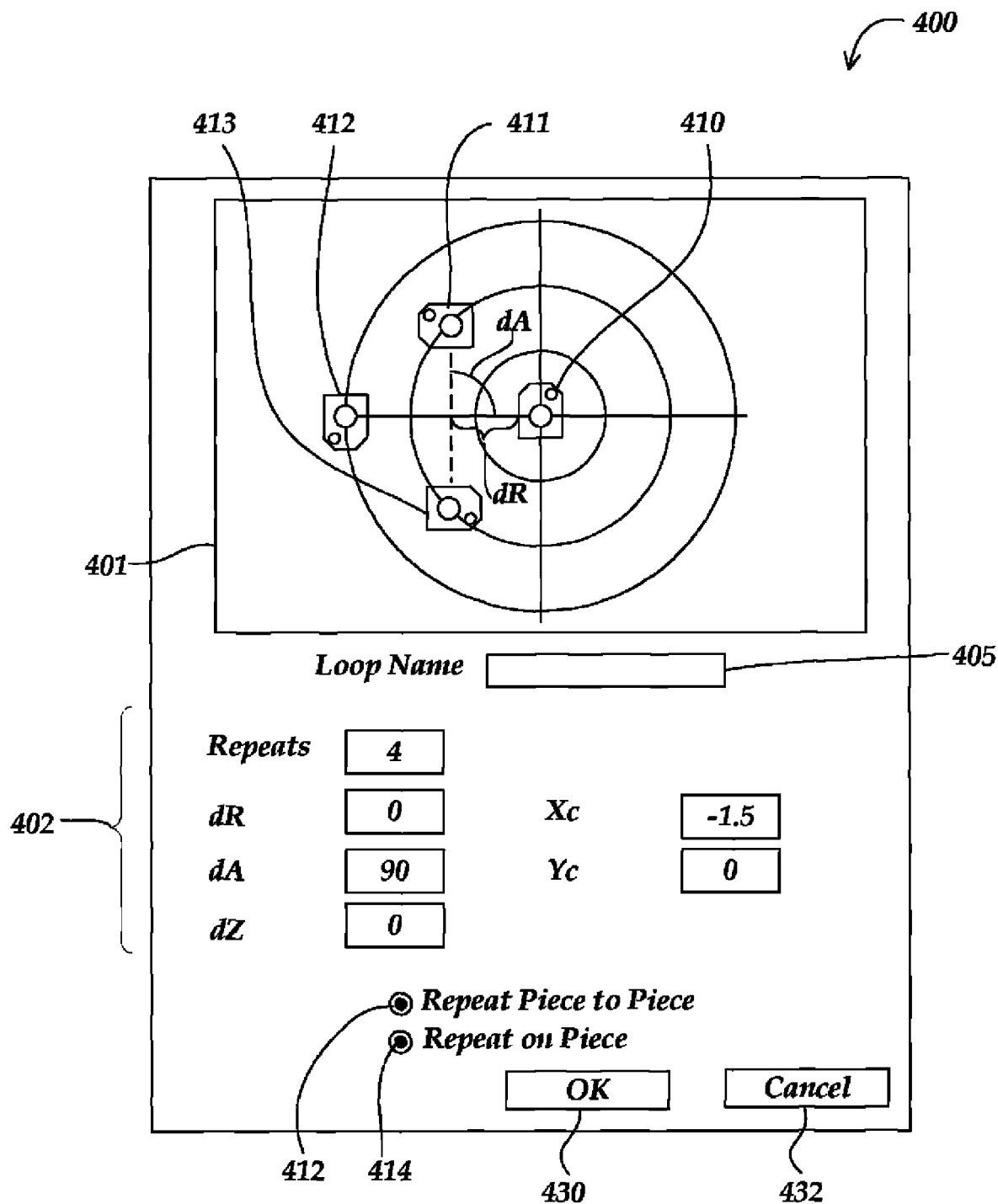
FIG. 4 is another screen shot of a display of the machine vision inspection system of FIG. 1, illustrating the GUI comprising a dialog box for defining step and repeat locations in cylindrical coordinates, configured in accordance with other embodiments of the present invention.

FIG. 4 is a sample screen shot of the display device 136 (e.g., the display 16 of FIG. 1), illustrating the GUI features forming a step and repeat dialog box 400 that allows a user to define step and repeat locations in cylindrical coordinates. The step and repeat dialog box 400 includes a graphical display sub-box 401, and a set of repetition parameters 402, which may also be referred to as a repetition definition sub-box 402, despite the absence of an associated graphical box in FIG. 3. To a large extent, the structure and operation of the step and repeat dialog box 400 is similar to that of the dialog box 300 of FIG. 3, and may be understood by analogy. Therefore, only significant differences will be described here. For simplicity, the step and repeat dialog box 400 does not use the "nested loop" approach (previously described with reference to FIG. 3) for defining a "rotational" array of default locations for a configuration of workpiece features. However, similarly to FIG. 3, the configuration of the step and repeat dialog box 400 is merely one example according to the present invention and the invention is not limited to what is shown in FIG. 4.

The graphical display sub-box 401 shows four widgets (or dots) 41X arranged at four locations 410-413, respectively. The location 410 is the reference location in the cylindrical coordinates of FIG. 4 and, similarly to the reference location 310, may be represented differently graphically from the other locations 411-413. The user may define a set of default step and repeat locations by using the repetition definition sub-box 402 to define a set of repetition parameters which define the location 411-413. The user defines the center of the circular (or spiral or helical) arrangement of step and repeat default locations by entering numeric values for center offsets "Xc" and "Yc," relative to the reference location 410. In the illustrated example, the user has set the nominal center offset of step and repeat rotation (Xc, Yc) as (−1.5, 0). The user also defines the offset (delta) value of the radius "dR," the offset value of angles "dA," the offset value along the Z axis "dZ," and the number of instances the configuration is repeated. In the illustrated example, the user has specified "dA"=90° and the repeat number to be "4." Therefore, starting with the reference location 410 (A=0°), the default locations for the configuration to be inspected are repeated three times at locations at A=90°, 180°, and 270°, respectively, about the relative center (Xc, Yc) at (−1.5, 0). Though not illustrated, if a non-zero value is entered as "dR," instances of the configuration will be repeated in a generally spiral pattern (with an increasing or decreasing radius), and if a non-zero value is entered as "dZ," the instances will be repeated helically, with an offset along the Z axis that is perpendicular to both the X axis and the Y axis.

As before, the user may name the defined set of step and repeat locations in a "Loop Name" box 405. Also, the user may designate whether the defined step and repeat locations correspond to multiple workpieces (using the "Repeat Piece to Piece" button 412) or to multiple locations within a single workpiece (using the "Repeat on Piece" button 414), as previously outlined.

Also as before, in accordance with various exemplary embodiments of the present invention, the user may edit or modify the defined set of default step and repeat locations in the step and repeat dialog box 400. Specifically, as with the embodiment shown in FIG. 3, the user may use an input device, such as the mouse 26, to select one or more default step and repeat locations in the graphical display sub-box 401, to be excluded from the final set of step and repeat locations to be inspected (i.e., the "inspection" step and repeat locations). Also as before, the user may readily reinstate the excluded locations by, for example, selecting the excluded locations using the mouse 26. Though not illustrated, a suitable "Define Excluded Range" sub-box, as shown in FIG. 3, may be used in the step and repeat dialog box 400 to allow the user to numerically (or textually) define a range of default step and repeat locations to be excluded from the final inspection set of step and repeat locations.

Once the inspection step and repeat locations are fully defined, the user may select the OK button 430. On the other hand, if the user wishes to cancel any step and repeat location definition performed so far, the user may select the CANCEL button 432. The advantages of the combination of interactive graphical and text-based features included in the step and repeat dialog box 400 are similar to the advantages previously outlined for the embodiment shown in FIG. 3.

Figure 5:
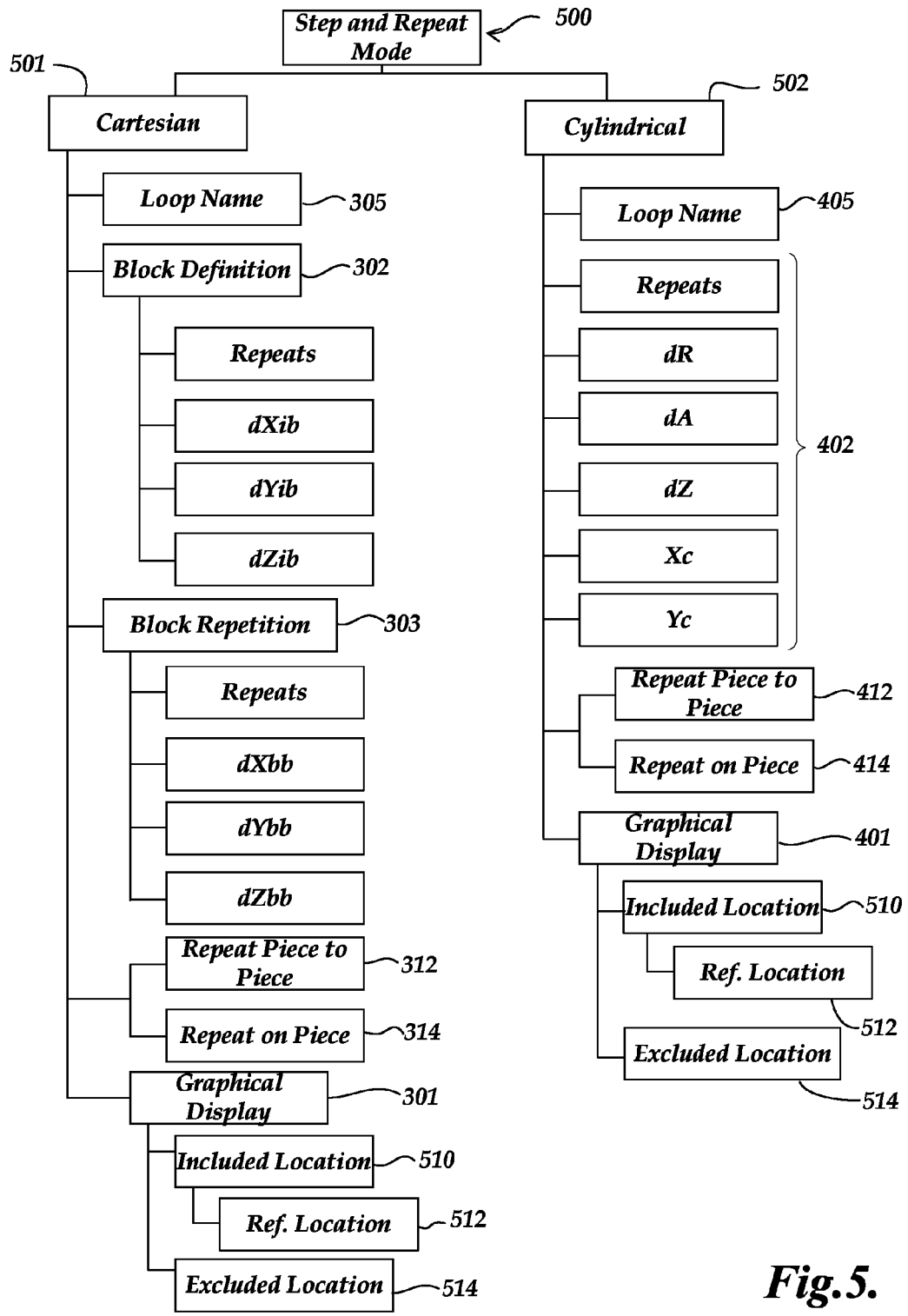
FIG. 5 is a diagram schematically illustrating one exemplary organization of set-up parameters used in defining step and repeat locations in both Cartesian coordinates as in FIG. 3 and cylindrical coordinates as in FIG. 4, according to exemplary embodiments of the present invention.

FIG. 5 is a diagram schematically illustrating one exemplary organization of set-up parameter elements used in defining "default" and "inspection" step and repeat locations in either Cartesian coordinates or cylindrical coordinates, as described above. The step and repeat mode program or subroutine 500 includes "Cartesian" mode elements 501 and "Cylindrical" mode elements 502. The "Cartesian" mode elements 501 include various parameters and features used to define step and repeat locations, as described above in reference to FIG. 3. The same or similar elements as previously described in FIG. 3 are referenced by the same numbers.

Specifically, these elements include a "Loop Name" parameter 305, various parameters ("Repeats," "dXib," "dYib," "dZib") used in the block definition sub-box 302, various parameters ("Repeats," "dXbb," "dYbb," "dZbb") used in the block repetition definition sub-box 303, and the "Repeat Piece to Piece" selection button 312 and "Repeat on Piece" section button 314. Also included in the "Cartesian" mode elements 501 are various elements used to define the inspection step and repeat locations in the graphical display sub-box 301, such as the "Included Location" element(s) 510, the "Reference Location" element(s) 512, and the "Excluded Location" element(s) 514.

The "Included Location" element(s) 510 allow the user to specify or confirm the "default" step and repeat locations to be the "inspection" step and repeat locations to be actually inspected. In most applications of the present invention, the reference location is one of the "Included Locations," i.e., one of the inspection step and repeat locations, and the "Reference Location" parameter 512 may additionally be used to render the reference location appear graphically differently from the rest of the inspection step and repeat locations. The "Excluded Location" element(s) 514 allow the user to exclude one or more of the "default" step and repeat locations, so that those excluded locations will not form part of the final set of "inspection" step and repeat locations. As described above, the GUI features of the step and repeat dialog box 300 allow the user to readily modify the "Included Locations" and "Excluded Locations," for example by placing a cursor over and clicking on the location to be included or excluded, so as to intuitively confirm, exclude, or reinstate any of the default step and repeat locations to thereby define a final set of inspection step and repeat locations.

The "Cylindrical" mode elements 502 similarly includes various parameters and features used to define step and repeat locations, as described above in reference to FIG. 4. The same or similar elements as previously described in FIG. 4 are referenced by the same numbers. Specifically, these elements include a "Loop Name" parameter 405, various parameters ("Repeats," "dR," "dA," "dZ," "Xc," "Yc") used in the repetition definition sub-box 402, the "Repeat Piece to Piece" selection button 412 and "Repeat on Piece" section button 414. The "Cylindrical" mode elements 502 also includes various elements used to define the inspection step and repeat locations in the graphical display sub-box 401, such as the "Included Location" element(s) 510 including the "Reference Location" element(s) 512, and the "Excluded Location" element(s) 514. As before, the "Included Location" element(s) 510 allow the user to specify or confirm the "default" step and repeat locations to be the "inspection" step and repeat locations to be actually inspected. The "Excluded Location" element(s) 514 allow the user to exclude one or more of the "default" step and repeat locations, so that those excluded locations will not form part of the final set of "inspection" step and repeat locations.

Figure 6:
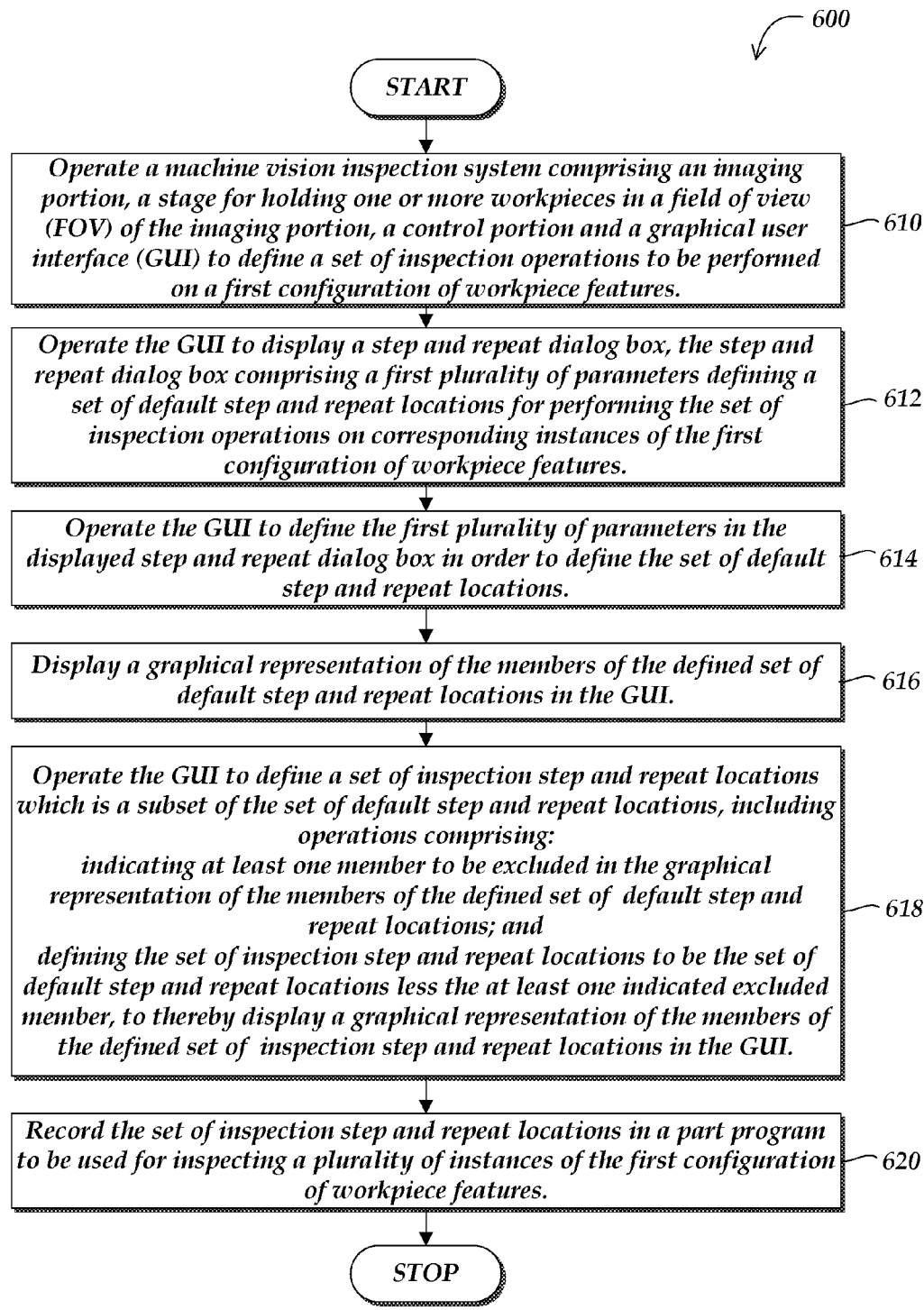
FIG. 6 is a flow chart illustrating a method for programming step and repeat operations, including defining step and repeat locations, of the machine vision inspection system of FIG. 1, in accordance with exemplary embodiments of the present invention.

FIG. 6 is a flow chart illustrating a method for programming step and repeat operations, including defining step and repeat locations, of the machine vision inspection system of FIG. 1, in accordance with exemplary embodiments of the present invention. In step 610, a machine vision inspection system, such as the system 10 of FIG. 1 (or the system 100 of FIG. 2) is provided and operated. The system includes the imaging portion 34, the movable stage 32 for holding one or more workpieces in a field of view (FOV) of the imaging portion 34, the control portion 14 (or the control system portion 120 in FIG. 2), and a graphical user interface (GUI)

such as shown in FIGS. 3 and 4, to define a set of inspections to be performed on a first configuration of workpiece features.

In step 612, the GUI is operated to display a step and repeat dialog box, such as those dialog boxes shown in FIGS. 3 and 4. The step and repeat dialog box includes a first plurality of parameters defining a set of default step and repeat locations (e.g., the parameters in the block definition sub-box 302, the block repetition definition sub-box 303, and the repetition definition sub-box 402) for performing the set of inspection operations on corresponding instances of the first configuration of workpiece features.

In step 614, the GUI is operated to define the first plurality of parameters in the displayed step and repeat dialog box in order to define the set of default step and repeat locations. In other words, the first plurality of parameters are set so as to define the default step and repeat locations, where the instances of the first configuration may appear and receive the set of inspection operations.

In step 616, the graphical representation of the members of the defined set of default step and repeat locations is displayed in the GUI.

In step 618, the GUI is operated to define a set of "inspection" step and repeat locations, which is a subset of the set of default step and repeat locations. Specifically, the user indicates at least one member to be excluded in the graphical representation of the members of the defined set of default step and repeat locations displayed in the GUI. As described above, user indication may be based on placing a suitable input device, such as a cursor of the mouse 26, near or above the member to be excluded. Then, the set of inspection step and repeat locations is defined to be the set of default step and repeat locations less the at least one indicated excluded member, to thereby display a graphical representation of the members of the defined set of inspection step and repeat locations in the GUI.

In step 620, the set of inspection step and repeat locations is recorded in a part program to be used for inspecting a plurality of instances of the first configuration of workpiece features. For example, the set of inspection step and repeat locations defined in step 618 above is recorded in the part program together with the set of inspection operations to be performed on the first configuration at each of the inspection step and repeat locations.

Figure 7:
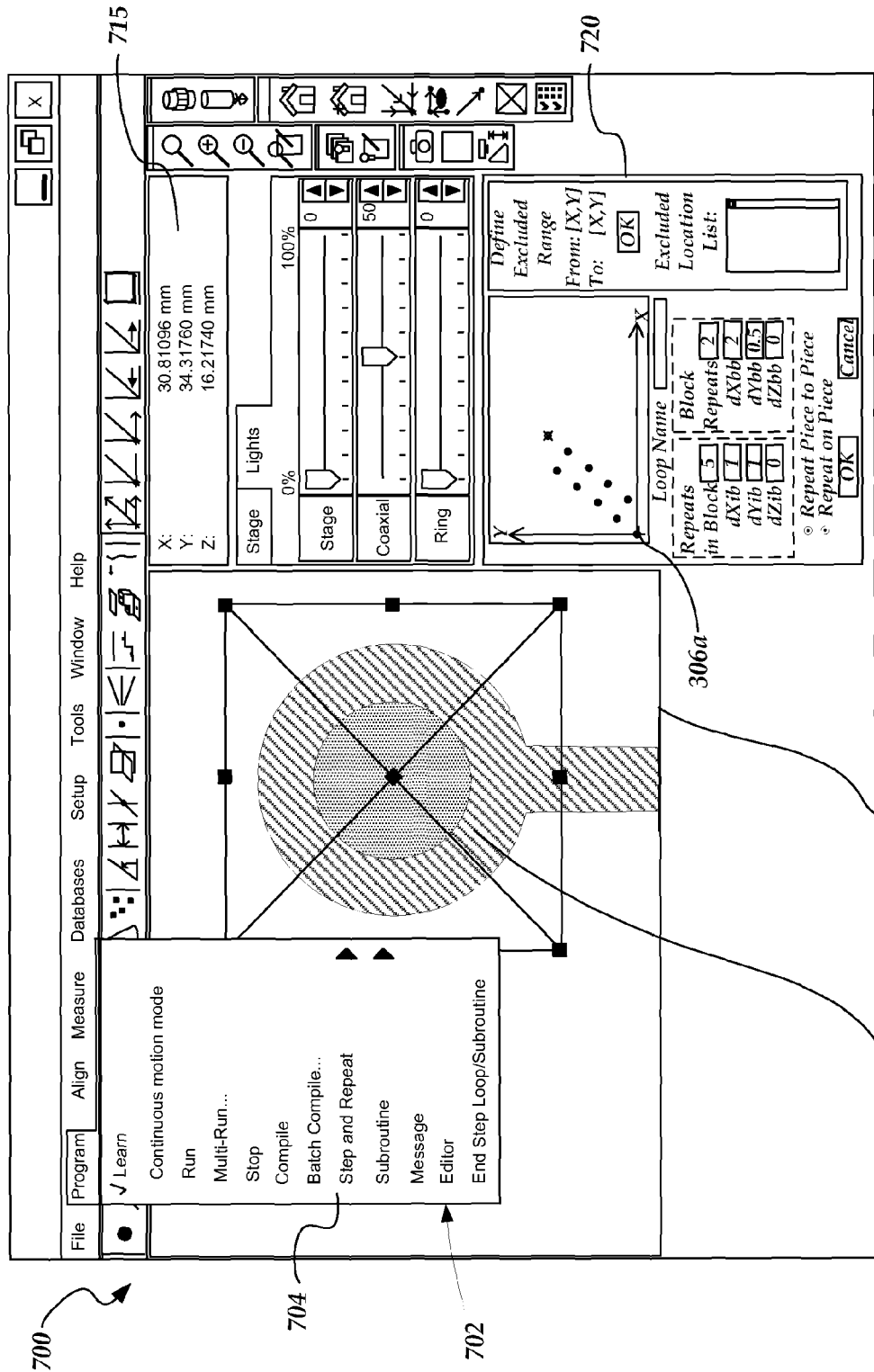
FIG. 7 is a sample screen shot of a display of the machine vision inspection system of FIG. 1, illustrating some features associated with the definition of inspection operations to be performed on each of a set of step and repeat locations to be inspected (e.g., a set of dots in the step and repeat dialog box in the illustrated example), in accordance with one embodiment of the present invention.

FIG. 7 is a sample screen shot 700 of a display of the machine vision inspection system 10 of FIG. 1, illustrating some features associated with the definition of inspection operations to be performed on each of a set of inspection step and repeat locations, in accordance with one embodiment of the present invention. In the illustrated example, the machine vision inspection system 10 is operating in the learn mode, and from the tool bar near the top of the screen shot 700, a pull-down menu of "Program" 702 has been selected. Further, in the pull-down menu of "Program" 702, the checkmark by "Learn" mode indicates that it is the active mode, and the "Step and Repeat" programming mode selector 704 has been activated. The movable stage 32 has been moved to be at a position indicated by the X, Y, Z coordinates shown in a window 715, to support imaging (using the imaging portion 34) and inspection of one or more instances of a configuration of workpiece features 710 (e.g., a circular printed circuit board hole) in the FOV. An image of the FOV, as well as any video tools that are used to program inspection operations, are generally provided in the workpiece display window 712. The configuration of workpiece features 710 may correspond to a reference location, as outlined previously. The user may define a set of inspection operations to be performed on the configuration of workpiece features 710 by using various video tools, such as edge/boundary detection video tools, as described above. During learn mode, or upon exiting learn mode, the set of inspection operations defined for the configuration 710 are recorded in a part program to be used for inspecting a plurality of instances of similar configurations of workpiece features at respective step and repeat locations.

Still referring to FIG. 7, the screen shot 700 further includes a step and repeat dialog box 720, similar to the step and repeat dialog box 300 of FIG. 3 comprising the graphical display sub-box 301, the block definition sub-box 302, and the block repetition definition sub-box 303. As described in detail above, the user may define, using the step and repeat dialog box 720, the default step and repeat locations as well as the inspection step and repeat locations where the set of inspection operations defined for the configuration 710 are to be performed on additional instances that correspond to the configuration 710. The configuration 710 may be defined as a reference location similar to the reference location 310a described with reference to FIGS. 3 and 4, and used as a reference point for generating the default set of step and repeat locations. In various exemplary embodiments of the present invention, it may be defined as the reference location because the "Step and Repeat" programming mode selector 704 is activated in association with defining the inspection operations performed at that particular instance and location of that particular configuration of workpiece features 710. Activation of the "Step and Repeat" programming mode selector 704 may initiate the display of the step and repeat dialog box 720. Then, when the inspection step and repeat locations are defined using the step and repeat dialog box 720, and recorded in a part program to be used for inspecting a plurality of instances of the first configuration of workpiece features (step 620 of FIG. 6), the set of inspection operations originally defined relative to the configuration 710 at the reference location is recorded in the part program so as to be repeatedly performed at each of the defined inspection step and repeat locations.

It should be noted that the order in which the set of inspection operations is defined and the set of inspection step and repeat locations is defined may vary in various embodiments. In some embodiments, the user may define the inspection step and repeat locations first using the step and repeat dialog box 720 and thereafter define the set of inspection operations to be performed relative to the instance of the configuration 710 at the reference location. In other embodiments, the user may define the set of inspection operations to be performed on the configuration 710 first, and thereafter define the inspection step and repeat locations based on the reference location in the step and repeat dialog box 720.

Figure 8:
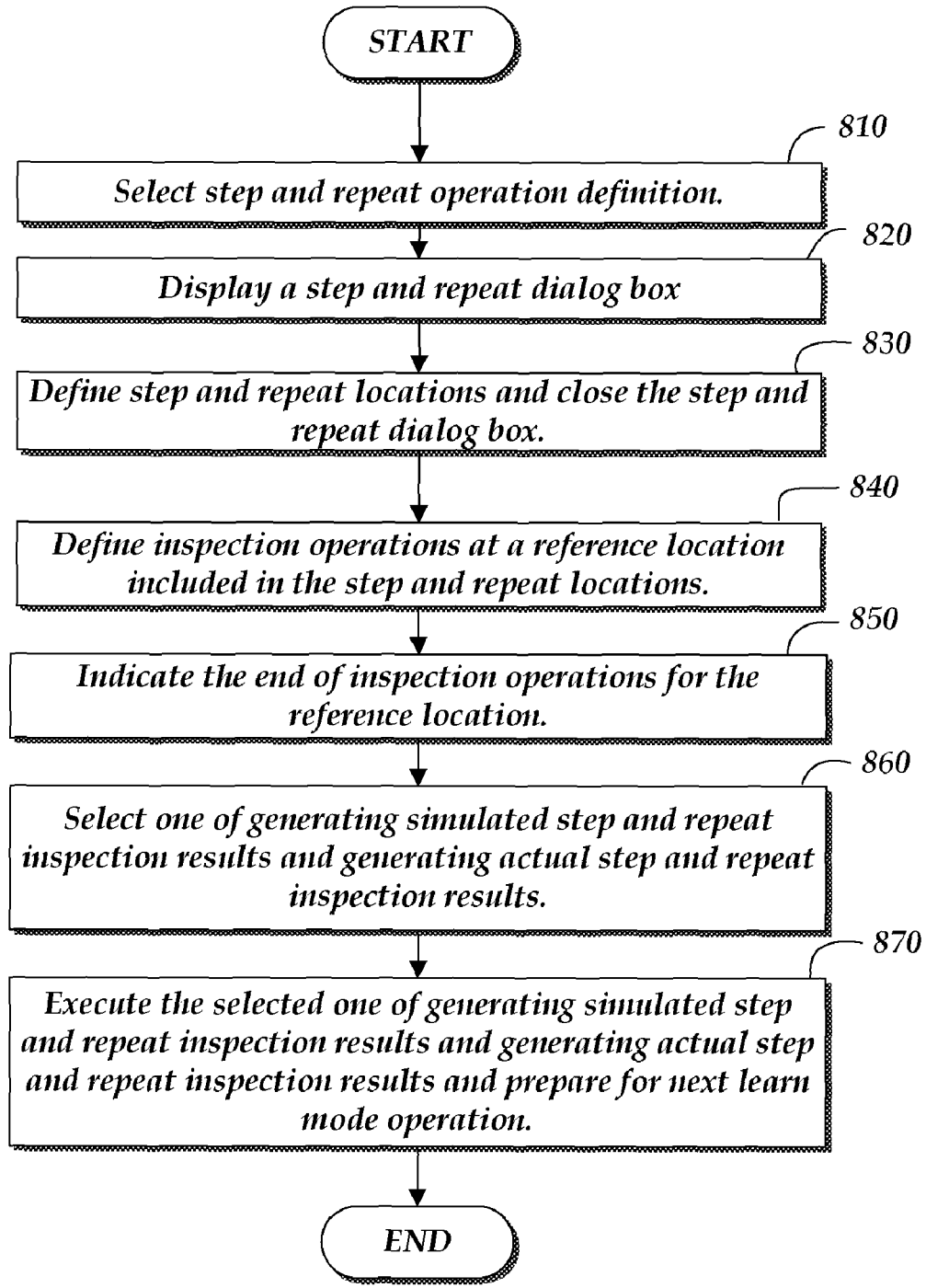
FIG. 8 is a flow chart illustrating a method for programming step and repeat operations, including defining and verifying operations to be performed during learn mode for each of a set of step and repeat locations, in accordance with exemplary embodiments of the present invention.

FIG. 8 is a flow chart illustrating a method for programming step and repeat operations, including defining and verifying inspection operations to be performed during learn mode for each of the inspection step and repeat locations in accordance with one embodiment of the present invention. In step 810, the user selects a "Step and Repeat" operation definition by, for example, selecting the "Step and Repeat" 704 in the "Program" pull-down menu 702 as shown in FIG. 7.

In step 820, the step and repeat dialog box 720 is displayed. In step 830, the user defines default step and repeat locations and inspection step and repeat locations in the step and repeat dialog box 720 and, after accepting the inspection step and repeat locations, may close the step and repeat dialog box 720.

In step 840, the user defines, using various video tools for example, a set of inspection operations relative to the first configuration at a reference location included in the inspection step and repeat locations defined in the step and repeat dialog box 720. In step 850, the user indicates the end of definition of inspection operations for the configuration of workpieces features 710 associated with the reference location by, for example, selecting an "OK" button (not shown).

In step 860, the user selects one of generating simulated step and repeat inspection results and generating actual step and repeat inspection results. To this end, in one embodiment, a dialog box as shown in FIG. 9 may be automatically displayed on the display device 136 of the machine vision inspection system following the user-indicated end of the definition of inspection operations associated with the reference location, as outlined above. A dialog box such as that shown in FIG. 9 may prompt a user to select one of these two options. Specifically, once the set of inspection operations to be performed as well as all of the inspection step and repeat locations are fully defined, during the learn mode, the user may be prompted to select either generating simulated step and repeat inspection results or generating actual step and repeat inspection results. After making the selection, the user then selects the "OK" or "CANCEL" button to finalize the selection. During the learn mode when the user finishes defining a step and repeat program to be part of a workpiece program (or a part program), typically the user wishes to actually run the newly defined step and repeat program to confirm its operability and performance. In some cases where there is a relatively large number of repeated instances to be inspected, however, the user may wish to forego actually running the program and instead merely simulate running the program to avoid time-consuming actual measurements/inspection to save time. The operation of generating actual or simulated step and repeat inspection results will be described in detail in reference to FIG. 10 below.

In step 870, based on the user selection made in step 860 above, either actual or simulated step and repeat inspection results are generated. At this point, the definition of the step and repeat programming as well as its actual or simulated run are completed. Thus, the user proceeds to perform the next learn mode operation (e.g., the definition of additional inspection steps on other workpiece features, or special analysis of the step and repeat inspection results, or the like).

Figure 10:
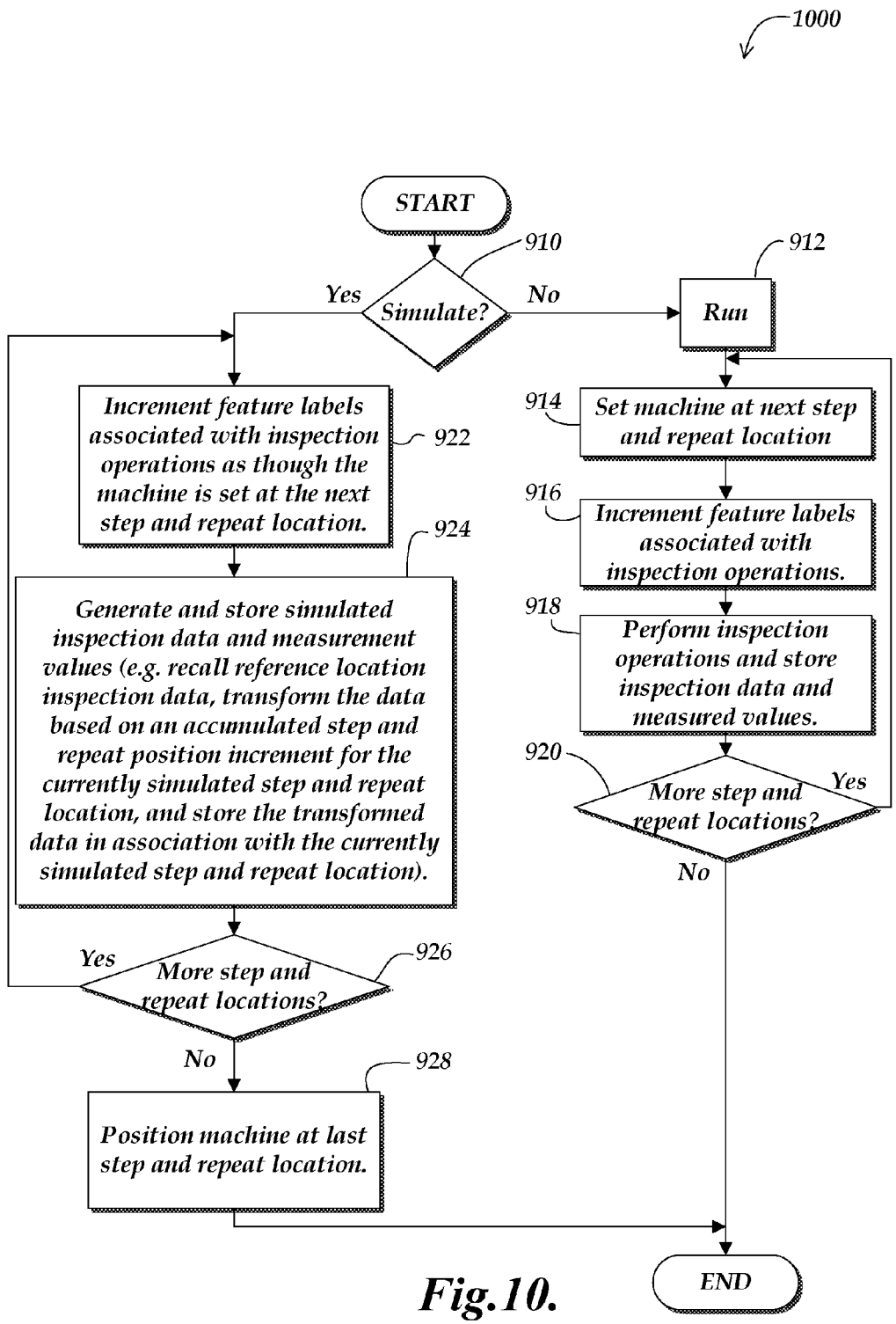
FIG. 10 is a flow chart illustrating the processing associated with generating simulated or actual step and repeat inspection results in response to the user selection made in the dialog box of FIG. 9, in accordance with exemplary embodiments of the present invention.

FIG. 10 is a flow chart illustrating the processing associated with generating simulated or actual step and repeat inspection results in response to the user selection made in the dialog box of FIG. 9, in accordance with exemplary embodiments of the present invention.

In step 910, it is determined whether the user has selected to generate simulated step and repeat inspection results or not. If not ("No"), in step 912, the step and repeat operations that have been defined are actually run on the machine vision inspection system 100. Specifically, in step 914, the machine vision inspection system 100 is set to the next inspection step and repeat location in a series of inspection step and repeat locations. Initially, this is the first step and repeat location in the series. In step 916, feature labels associated with inspection operations are incremented. In step 918, inspection operations are actually performed at the current step and repeat location, and the actual inspection results (i.e., inspection data and measured values) are stored. In step 920, it is determined whether more inspection step and repeat locations exist. If yes, returning to step 914, the machine vision inspection system 100 is set to the next inspection step and repeat location in the series of step and repeat locations, and steps 916 through 920 are repeated until, in step 920, it is determined that no more inspection step and repeat locations exist.

Returning to step 910, if it is determined that the user has selected to generate simulated step and repeat inspection results ("Yes"), in step 922, feature labels associated with inspection operations are incremented as though the machine vision inspection system 100 is set at the next step and repeat location (although it is, in fact, not). In step 924, simulated inspection results (i.e., simulated inspection data and measurement values) are generated and stored. The simulated inspection results may include, for example, results obtained by recalling reference location inspection data (e.g., measurement values obtained at the reference location) and transforming the reference location inspection data based on an accumulated step and repeat position increment for the currently simulated step and repeat location, which are then stored in association with the currently simulated step and repeat location. In step 926, it is determined whether more inspection step and repeat locations exist. If yes, returning to step 922, features labels associated with inspection operations are again incremented as though the machine vision inspection system 100 is set at the next step and repeat location (though it is, in fact, not), and steps 924 and 926 are repeated until, in step 926, it is determined that no more inspection step and repeat locations exist. Then, in step 928, the machine vision inspection system 100 is actually positioned at the last inspection step and repeat location in the series of step and repeat locations, ready for additional programming operations. One value of generating simulated inspection results is that the generated dummy coordinates and measurement and inspection results are then usable in later programming operations (e.g., to generate additional inspection dimensions, between the dummy coordinates and later-inspected measurement features, and the like).

As described above, various exemplary embodiments of the present invention provide efficient, intuitive, and flexible GUI features that allow a user to readily program and use step and repeat loop operations in a machine vision inspection system.

While various preferred and exemplary embodiments of the invention have been illustrated and described, it will be appreciated that various changes can be made therein without departing from the spirit and scope of the invention.

The embodiments of the invention in which an exclusive property or privilege is claimed are defined as follows:

1. A method for programming step and repeat operations of a machine vision inspection system, the machine vision inspection system including an imaging portion, a stage for holding one or more workpieces in a field of view (FOV) of the imaging portion, a control portion, and a graphical user interface (GUI), the method comprising:

operating the machine vision inspection system to define a set of inspection operations to be performed on a first configuration of workpiece features;

operating the GUI to display a step and repeat dialog box, the step and repeat dialog box comprising a first plurality of parameters defining a set of default step and repeat locations for performing the set of inspection operations on corresponding instances of the first configuration of workpiece features;

operating the GUI to define the first plurality of parameters in the displayed step and repeat dialog box in order to define the set of default step and repeat locations, to thereby display a graphical representation of the members of the defined set of default step and repeat locations in the GUI;

operating the GUI to define a set of inspection step and repeat locations which is a subset of the set of default step and repeat locations; and recording the set of inspection step and repeat locations in a part program to be used for inspecting a plurality of instances of the first configuration of workpiece features;

wherein operating the GUI to define a set of inspection step and repeat locations further comprises:

indicating at least one member to be excluded in the graphical representation of the members of the defined set of default step and repeat locations displayed in the GUI; and defining the set of inspection step and repeat locations to be the set of default step and repeat locations less the indicated at least one member to be excluded, to thereby display a graphical representation of the members of the defined set of inspection step and repeat locations in the GUI, and wherein the members of the set of default step and repeat locations and the members of the set of inspection step and repeat locations are represented by individual widgets in their graphical displays, and the excluded members are represented by one of altered widgets and empty spaces.

2. The method of claim 1, further comprising:

indicating at least one additional member to be excluded in the graphical representation of the members of the defined set of inspection step and repeat locations; and defining the set of inspection step and repeat locations to exclude the at least one additional excluded member, to thereby display a graphical representation of the members of the defined set of inspection step and repeat locations in the GUI.

3. The method of claim 1, wherein indicating a member to be excluded comprises positioning a cursor proximate to the member to be excluded in the graphical representation of the members of the defined set of default step and repeat locations, and operating an input device of the machine vision inspection system to select that member for exclusion.

4. The method of claim 1, wherein displaying the graphical representation of the members of the defined set of inspection step and repeat locations comprises at least one of overwriting and modifying the graphical representation of the members of the set of default step and repeat locations to provide the graphical representation of the members of the defined set of inspection step and repeat locations.

5. The method of claim 1, wherein the set of inspection step and repeat locations is automatically modified and its graphical representation displayed in response to the indication of a member to be excluded.

6. The method of claim 1, wherein the graphical representation of the defined set of default step and repeat locations is automatically modified and displayed in response to entering parameter values included in the first plurality of parameters in the displayed step and repeat dialog box.

7. The method of claim 6, wherein the first plurality of parameters in the displayed step and repeat dialog box comprise Cartesian coordinate step and repeat offset values dXib and dYib within a block of step and repeat locations and a first repeat number indicating the number of members in that block, and Cartesian coordinate step and repeat offset values dXbb and dYbb for repeating the block and a second repeat number indicating the number of blocks, and the graphical representation of the defined set of default step and repeat locations is responsive to values entered for dXib, dYib, dXbb, dYbb, the first repeat number and the second repeat number.

8. The method of claim 6, wherein the first plurality of parameters in the displayed step and repeat dialog box comprise cylindrical coordinate step and repeat spacing values dR and dA and a repeat number indicating the number of members, and the graphical representation of the defined set of default step and repeat locations is responsive to values entered for dR, dA, and the repeat number.

9. The method of claim 1, wherein the set of inspection operations to be performed on a first configuration of workpiece features are defined by operations performed corresponding to a reference location used for generating the default set of step and repeat locations, and the reference location widget has a unique widget appearance in the graphical displays.

10. The method of claim 1, further comprising:

indicating at least one excluded member to be added back as a member in the graphical representation of the members of the defined set of inspection step and repeat locations; and defining the set of inspection step and repeat locations to include the added-back member, to thereby display a graphical representation of the members of the defined set of inspection step and repeat locations in the GUI.

11. The method of claim 10, wherein indicating an excluded member to be added back as a member comprises positioning a cursor proximate to the location of the excluded member, in the graphical representation of the members of the defined set of inspection step and repeat locations, and operating an input device of the machine vision inspection system to select the excluded member location such that it is added back.

12. The method of claim 1, wherein the dialog box comprises an indicator that defines whether the set of inspection step and repeat locations are arranged for inspecting a plurality of instances of the first configuration of workpiece features on a single workpiece or for inspecting a plurality of instances of the first configuration of workpiece features on a corresponding plurality of similar workpieces.

13. The method of claim 1, wherein the graphical representations of the members of the set of default step and repeat locations and the members of the set of inspection step and repeat locations are presented within the boundaries of the dialog box.

14. The method of claim 1, wherein the dialog box comprises a button for accepting the currently defined and displayed set of inspection step and repeat locations, and the method further comprises a user activating the button, wherein the step of recording the set of inspection step and repeat locations in a part program occurs after the user activates the button.

15. The method of claim 1, wherein the GUI further comprises a second dialog box that includes selectors governing whether a set of learn mode operations comprises actually repeating the defined set of inspection operations corresponding to the recorded set of inspection step and repeat locations to generate actual step and repeat inspection results or whether a set of learn mode operations comprises simulating data corresponding to repeating the defined set of inspection operations at the recorded set of inspection step and repeat locations, without actually repeating the defined set of inspection operations, to generate simulated step and repeat inspection results, and the method further comprises:

choosing one of the selectors to generate and store actual step and repeat inspection results; or choosing the other of the selectors to generate and store simulated step and repeat inspection results.

16. A machine vision inspection system including an imaging portion, a stage for holding one or more workpieces in a field of view (FOV) of the imaging portion, a control portion, and a graphical user interface (GUI), the control portion including a computer-executable program that causes the GUI to allow a user to perform the steps comprising:

operating the GUI to define a set of inspection operations to be performed on a first configuration of workpiece features;

operating the GUI to display a step and repeat dialog box, the step and repeat dialog box comprising a first plurality of parameters defining a set of default step and repeat locations for performing the set of inspection operations on corresponding instances of the first configuration of workpiece features;

operating the GUI to define the first plurality of parameters in the displayed step and repeat dialog box in order to define the set of default step and repeat locations, to thereby display a graphical representation of the members of the defined set of default step and repeat locations in the GUI;

operating the GUI to define a set of inspection step and repeat locations which is a subset of the set of default step and repeat locations; and recording the set of inspection step and repeat locations in a part program to be used for inspecting a plurality of instances of the first configuration of workpiece features;

wherein operating the GUI to define a set of inspection step and repeat locations further comprises:

indicating at least one member to be excluded in the graphical representation of the members of the defined set of default step and repeat locations displayed in the GUI; and defining the set of inspection step and repeat locations to be the set of default step and repeat locations less the indicated at least one member to be excluded, to thereby display a graphical representation of the members of the defined set of inspection step and repeat locations in the GUI, and wherein the members of the set of default step and repeat locations and the members of the set of inspection step and repeat locations are represented by individual widgets in their graphical displays, and the excluded members are represented by one of altered widgets and empty spaces.

17. The system of claim 16, wherein the GUI is configured such that, in response to the indication of a member to be excluded, the set of inspection step and repeat locations is automatically modified and its graphical representation displayed in the GUI.

18. The system of claim 16, wherein the GUI is configured such that, in response to entry of parameter values included in the first plurality of parameters in the displayed step and repeat dialog box, the graphical representation of the defined set of default step and repeat locations is automatically modified and displayed in the GUI.

19. The system of claim 16, wherein the GUI is configured such that the dialog box comprises a button for accepting the currently defined and displayed set of inspection step and repeat locations, and that activation of the button triggers recording of the set of inspection step and repeat locations in a part program.

* * * * *